June 24, 1930. J. CAMPANARO 1,766,483
ANTISKID DEVICE
Filed Feb. 28, 1925
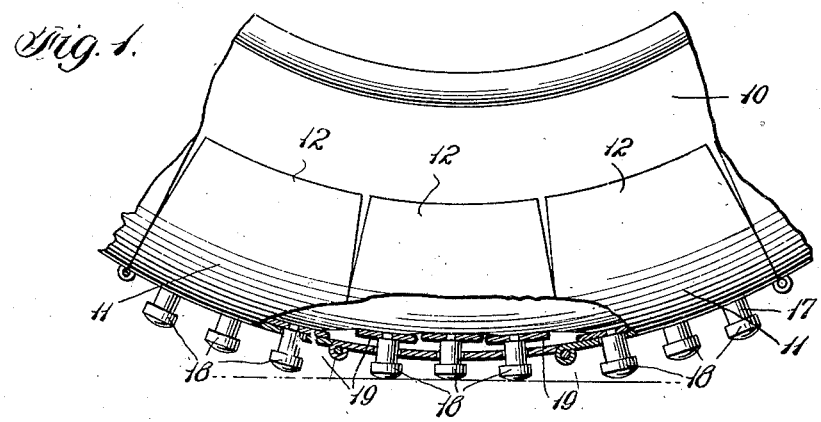
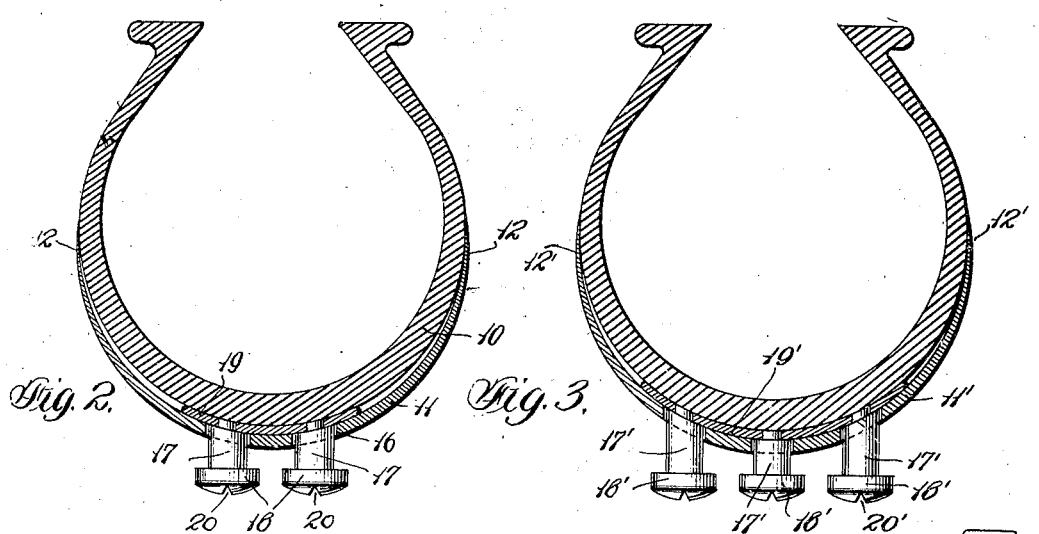
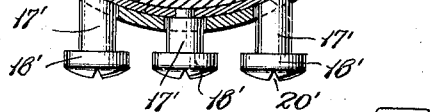
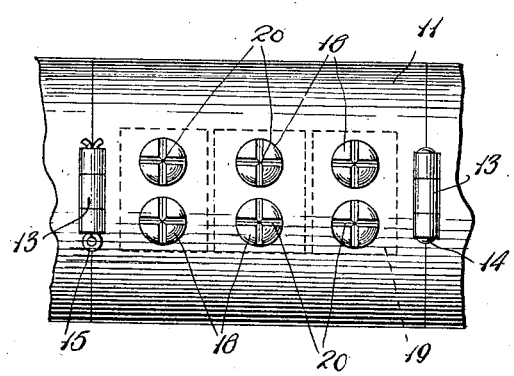
Inventor
John Campanaro,
By Walter W. Burns
Attorney Patented June 24, 1930

1,766,483

UNITED STATES PATENT OFFICE

JOHN CAMPANARO, OF PHILADELPHIA, PENNSYLVANIA

ANTISKID DEVICE

Application filed February 28, 1925. Serial No. 12,293.

This invention relates to anti-skid devices for vehicle wheels and particularly to those vehicle wheels equipped with pneumatic tires.

The primary object of my invention is the provision of an improved anti-skid device for vehicles equipped with pneumatic tires.

Another object of my invention is the provision of an anti-skid device having ground engaging sections and ground gripping devices movable relatively to the ground engaging sections.

Other and further objects will be apparent to those skilled in the art, from a reading of the complete specification and claims.

Referring to the drawing wherein I have illustrated a preferred embodiment of the invention, Fig. 1 is a side elevation of a vehicle tire showing my invention attached thereto, and having portions cut away to expose the inner construction more clearly.

Fig. 2 is a cross section of Fig. 1.

Fig. 3 is a cross section of a larger tire than that illustrated in Fig. 2 and showing a construction of my invention applicable to such a tire.

Fig. 4 is a plan view of the ground contacting portion of a section of my invention.

Figs. 5 and 6 illustrate one means of bringing the ends of my structure together when attaching the same to a wheel.

Like reference characters refer to similar parts throughout the several views.

Referring particularly to Figs. 1 and 2, 10 designates a portion of a pneumatic tire, of a vehicle, to which my invention is applied.

Curved segments 11 extend around the outside of the tire and are of such a shape that they fit the curved outer ground contacting portion of the tire. These sections are of maximum thickness at the line of contact with the ground and taper off to no thickness as shown at 12 adjacent the middle of the tire. A sufficient clearance is provided between the sides of the tire and the tapered portions 12.

The sections are hinged together with a suitable hinge structure 13, the component pintle bearing parts of which may be constructed, as shown, as a part of the adjacent segments themselves. The pintle of the hinge consists of an ordinary rivet as at 14 except at such place or places as it may be desired to have a removable pintle. At such points as it is desired to separate the segments, I provide steel split cotter pins in place of the rivet 14. One of these pins I have illustrated at 15.

Between the inner tapering edges of each two adjacent segments, I provide a tapering clearance which, in the smaller size tires, may amount to about one eighth of an inch adjacent the inner portion and tapering outwardly so that when the tapered portions of adjacent segments are together, due to the flexibility of the tire, the two edges of these segments will abut throughout their lengths.

Referring now particularly to Figs. 1, 2 and 4, it will be noted that the segments 11 are provided with spaced openings 16 in which are located the cylindrical shanks 17 of the ground contacting heads 18. The inner ends of the shanks 17 are secured in a suitable way, as by riveting, to the tire contacting pad 19. In the form of my invention shown in Figs. 1, 2 and 4, two ground contacting heads 18 are secured by their shanks 17 to one pad 19. These two heads are arranged side by side in a direction parallel to the wheel axis, so that they will, in the usual course of operation, engage the ground at the same time. Adjacent pads 19 are placed close to each other but not sufficiently close to cut the surface of the tire. The holes 16 are sufficiently large to permit of free movement of the shanks 17 in the direction of their axes. The heads 18 are provided with cross grooves 20 for causing a better gripping action with the ground.

In the modification illustrated in Fig. 3 for a larger tire, the pad 19′ has secured thereto, three shanks 17′ to the end of each of which is secured a head 18′. These three shanks pass through corresponding openings 16′ in the segment 11′ and operate similarly to the shanks 17 in the openings 16 previously described.

Referring particularly to Fig. 1 wherein I have illustrated the operation of my invention, it will be seen that when the heads 18 engage the ground, the shanks 17 move upwardly in their openings 16, causing the pads 19 to press against the tire. The tire will yield, permitting three or more sets of heads 18 to be in yielding contact with the ground. This construction upon hard ground gives a very smooth riding action and minimizes the shocks due to rough places. When, however, the vehicle is in soft ground, the shanks are extended to their maximum length and, with their heads, have a very effective gripping action with the ground.

It will be observed that should a stone be encountered, no shock is felt, due to this yielding action of the pad pressing against the tire.

The hinge portions are preferably more on the outside periphery of the segments in order to facilitate the rolling of the attachment as a whole when not in use.

In very soft ground, the wheels are prevented from spinning and even if any slight movement should take place, the segment will not prevent sharp stones to cut the tire as would be the case with anti-skid devices which expose the tire.

In Figures 5 and 6, I have illustrated one method of attaching the ends of the anti-skid device together. The device is preferably constructed in such a way that it will fit snugly over the tire. Since the presence of dirt and the increase of size as tires grow older make it necessary to draw the ends together, I provide pairs of jaws 40, 41. The jaws 40 have openings 42 spaced apart a distance equal to the distance between centers of the shanks of the ground gripping members. Similar openings are provided at 43 on the jaws 41.

A block 44 having a threaded opening is integral with the jaws 40 and a block 44', having an opening therethrough, is integral with the jaws 41. A shaft having a collar 45 passes through the opening in the block 44' and has a threaded end 46 which cooperates with the threaded opening in the block 44. On the end of the shaft is a crank 47 which when turned, brings the jaws 40, 41 closer together or farther apart as it may be desired.

In use the ends of the anti-skid device are brought as close together as possible by hand. The jaws 40, 41 are then applied to the ends, the openings 42, 43 registering with the shanks of the ground gripping devices. The handle being turned, the ends of the segments are brought together and the split cotter pin inserted in the hinge member openings.

While I have shown and described my invention in detail I desire to have it understood that I do not limit myself to the exact showing and that modifications and changes may be made without departing from the spirit of my invention and within the scope of the appended claims.

Having described my invention what I claim is:—

1. An anti-skid attachment for vehicle wheels comprising a member of a shape to follow the contour of the outside periphery of the tire, said member having hinged sections constructed to articulate when in operation, the sections engaging the periphery and sides of the tire, and ground gripping means coacting independently with a plurality of sections, and each having a tire engaging portion and a plurality of shanks extending from the tire engaging portion through its section of the member and having portions outward of the outer periphery of the member.

2. An anti-skid attachment for vehicle wheels comprising a member of a shape to follow the contour of the outside periphery of the tire, the member comprising hinged sections articulating with the tire when bearing on the ground and having portions engaging the periphery and sides of the tire and ground gripping means coacting with a plurality of sections, and each having a tire engaging portion and a plurality of shanks extending from the tire engaging portion through its section of the member and having portions outward of the outer periphery of the member and heads thereon to engage the ground.

In testimony whereof I hereunto affix my signature.

JOHN CAMPANARO.